United States Patent
Esfahan et al.

(10) Patent No.: US 8,943,467 B2
(45) Date of Patent: Jan. 27, 2015

(54) ON-TARGET RAPID CONTROL PROTOTYPING

(75) Inventors: Hamid M. Esfahan, Ann Arbor, MI (US); Satish Kumar, East Lyme, CT (US); Shane M. Boehner, Fenton, MI (US)

(73) Assignee: GM Global Technology Operations LLC

( * ) Notice: Subject to any disclaimer, the term of this patent is extended or adjusted under 35 U.S.C. 154(b) by 1222 days.

(21) Appl. No.: 12/555,338

(22) Filed: Sep. 8, 2009

(65) Prior Publication Data

US 2010/0192122 A1    Jul. 29, 2010

Related U.S. Application Data

(60) Provisional application No. 61/147,279, filed on Jan. 26, 2009.

(51) Int. Cl.
*G06F 9/44* (2006.01)
*G05B 19/042* (2006.01)
*G06F 9/45* (2006.01)
*G06F 9/445* (2006.01)

(52) U.S. Cl.
CPC .............. *G05B 19/0426* (2013.01); *G06F 8/35* (2013.01); *G06F 8/41* (2013.01); *G06F 8/60* (2013.01); *G05B 2219/23389* (2013.01); *G06F 8/34* (2013.01)
USPC ........................................................ 717/107

(58) Field of Classification Search
None
See application file for complete search history.

(56) References Cited

U.S. PATENT DOCUMENTS 7,076,740 B2 *    7/2006    Santori et al. ................. 715/771

FOREIGN PATENT DOCUMENTS

CN            101308365           11/2008

OTHER PUBLICATIONS dSPACE Catalog 2008, pp. 1-505.

* cited by examiner

*Primary Examiner* — Henry Tsai
*Assistant Examiner* — Juanito Borromeo

(57) ABSTRACT

An on-target rapid control prototyping (RCP) system includes a host control module that generates a first RCP model based on selected function blocks in a block library. A target language compiler converts the first RCP model into source code. A cross-compiler coverts the source code into object code. A download module performs an on-target download of the object code from a host that includes the host control module to a production control module of a production system that is separate from the host.

21 Claims, 12 Drawing Sheets

ON-TARGET RAPID CONTROL PROTOTYPING

CROSS-REFERENCE TO RELATED APPLICATIONS

This application claims the benefit of U.S. Provisional Application No. 61/147,279, filed on Jan. 26, 2009. The disclosure of the above application is incorporated herein by reference in its entirety.

FIELD

The present disclosure relates to rapid control prototyping.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Rapid control prototyping (RCP) is a process that allows engineers to develop, modify and test control strategies on a production system. RCP allows vehicle engineers, for example, to develop and test vehicle and system control strategies in a test lab prior to the production of a vehicle. A production system, such as an engine system, is operated and monitored to provide data in real-time or during the actual time over which a test process occurs. The data may be monitored by a RCP system and used by the vehicle engineer to modify and improve a particular control strategy. RCP allows for quick modifications to and testing of the control strategy. RCP decreases development and testing time.

A RCP system, such as a dSPACE™ system, typically includes a host computer and an off-target intermediate computer that communicates with a production controller. A system developer generates a RCP model to be tested on the host computer using a math modeling program, such as Simulink™. The RCP model includes a symbolic I/O block set that represents a control strategy. The control strategy or algorithm is developed as a symbolic model, as opposed to a set of codes, such as a series of instructions in C-code.

The host computer converts the RCP model into a compilable code, which is then cross-compiled to generate an executable program. The compilable code may be in, for example, C-code. The executable program is downloaded to the off-target intermediate computer. The compilable code is cross-compiled and linked with target specific code of the off-target intermediate computer. The target specific code may be associated with a scheduler, I/O routines, and communication routines specific to the off-target intermediate computer. The off-target intermediate computer is a stand-alone device with analog, digital and serial I/O links to communicate with the host computer and the production controller.

The off-target intermediate computer runs the executable program based on communication with the production controller. The executable program may be monitored and controlled by the host computer. For example, variables stored in memory of the production controller may be monitored, graphed, or logged. Gains of a control strategy may be tuned based on the monitored variables. Structure of the control strategy cannot be changed. When a block of the RCP model needs to be changed, for example, the RCP model is changed at the host computer and the build process to generate an executable program is repeated.

The production controller includes control software. The executable program is executed in cooperation with the control software. The control software may, for example, generate an execute signal and an information signal. The off-target intermediate computer executes the executable program based on the execute signal and the information signal. The information signal includes information needed by the off-target intermediate computer to execute the executable program, such as, addresses associated with sensor data. The off-target intermediate computer generates control signals based on the information signal and execution of the executable program. The control signals are provided to the production controller. The production controller operates a production system based on the control signals. Status data of the production system is fedback from the production controller to the host computer for monitoring and development purposes.

SUMMARY

In one embodiment, an on-target rapid control prototyping (RCP) system is provided that includes a host control module. The host control module generates a first RCP model based on selected function blocks in a block library. A target language compiler converts the first RCP model into source code. A cross-compiler coverts the source code into object code. A download module performs an on-target download of the object code from a host that includes the host control module to a production control module of a production system that is separate from the host.

In other features, a production system is provided and includes memory that stores an on-target rapid control prototyping (RCP) process code that is downloaded from a host. An application control module executes an application code. A RCP control module executes the on-target RCP process code. A target control module communicates with the application control module and the RCP control module and controls operation of the production system based on the execution of the application code and the on-target RCP process code.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
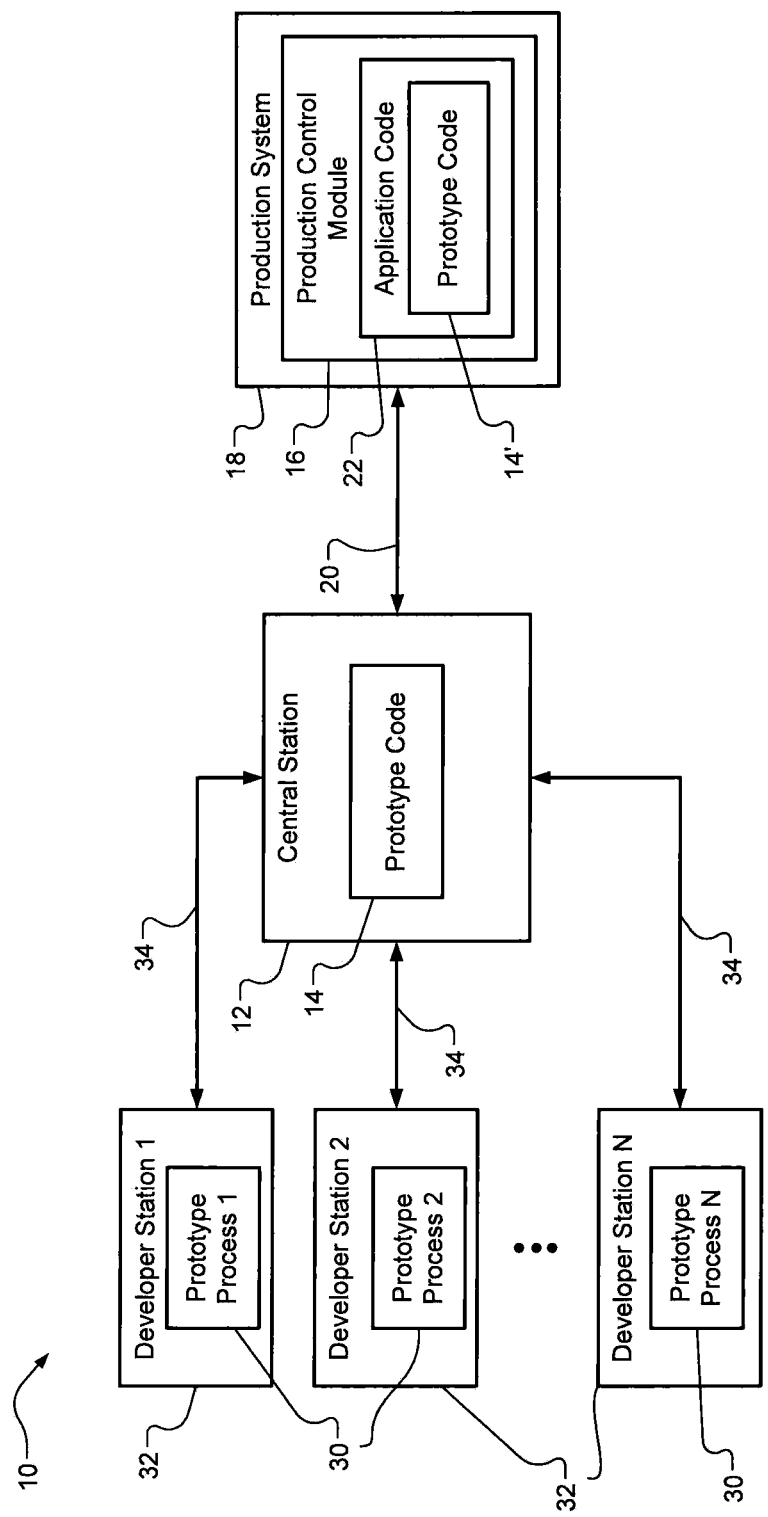
FIG. 1 is a functional block diagram of an on-target rapid control prototyping (RCP) network in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. Also, as used herein a software ring, such as a rapid control prototyping (RCP) ring, may refer to a set of instructions that are stored in memory and/or executed by a processor.

In addition, in the following description various variable labels and values are disclosed. The variable labels and values are provided as examples only. The variable labels are arbitrarily provided and may each be used to identify or refer to different items. For example, the variable label N may be used to refer to a number of prototype models or to a number of function blocks.

Furthermore, in the following description terms, such as "first", "second", and "third" are used. These terms are not specific to any one device, signal, etc. More than one of the terms may be used to refer to the same device, signal, etc. depending upon the context.

RCP is conventionally performed in an off-target manner using an off-target RCP system, such as a dSPACE™ prototyping system. A developed model is generated at a host computer, converted to an executable program, and downloaded to an off-target intermediate computer. The off-target intermediate computer communicates with a production controller, such as an engine control module, of a production system. The off-target intermediate computer is separate from the production system. The production controller may, for example, be located on a vehicle. The executable program is executed on the off-target intermediate computer and is used to control operation of the production controller. Thus, the executable program is not downloaded and executed on the production controller.

An off-target intermediate computer and associated software and hardware are costly. In addition, to perform off-target RCP, instrumentation is needed to facilitate communication between the intermediate computer and the production controller. Furthermore, training to use the off-target intermediate computer is needed to operate the off-target RCP system. The off-target intermediate computer hardware and/or software must be modified to communicate with different production controllers.

The following described embodiments provide on-target RCP systems and methods. On-target RCP refers to the download and execution of a prototype control algorithm on a production control module or the same control module as that of a production system under test. The term on-target RCP may also refer to the download of the prototype control algorithm to the production control module and the ability to control and monitor performance of the prototype control algorithm without the use of intermediate computer hardware. Executable code generated based on the prototype control algorithm is executed with other application (production) code on the production control module. The systems and methods described herein eliminate the need for the off-target intermediate computer and associated software, hardware and training.

In FIG. 1, an on-target RCP network 10 is shown. The on-target RCP network 10 includes a host or central station 12 that generates a prototype code 14 that is executable by a production control module (target) 16 of a production system 18. The central station 12 may include a laptop, a desktop computer, a handheld computer or programming device, etc. The production system 18 may include one or more vehicle systems, such as, an engine system, a transmission system, an exhaust system, a climate control system, a safety, countermeasure, and/or collision avoidance system, a guidance system, a vehicle electronic control system, etc. The production control module 16 may be, for example, an engine control module, a transmission control module, an exhaust system control module, an air conditioning control module, a safety control module, an electronic system control module, etc.

In operation the central station 12 generates and downloads the prototype code 14 to the production control module 16 via a wired or wireless link 20. The prototype code 14 is stored in a reserved location on the production control module 16 and/or in memory associated with the production control module 16. The production control module 16 executes an application code 22, which may be downloaded separately from or with the prototype code 16. The production control module 16 may execute the prototype code 14 in conjunction with the application code 22.

The on-target RCP network 10 may include one or more remote developer stations 30. Each developer station 30 may be used to generate a prototype process 32 for the production system 18. Each prototype process 32 may have an associated algorithm. The prototype processes 32 are downloaded to the central station 12 via wired or wireless links 34. The prototype processes 32 when executed by the production control module 16 may be functionally independent or dependent of each other. The prototype processes 32, when downloaded to the central station 12, may include source code, object code, compilable code, and/or compiled code. The central station 12 combines the code of the received processes 32 to generate the prototype code 14.

Figure 2:
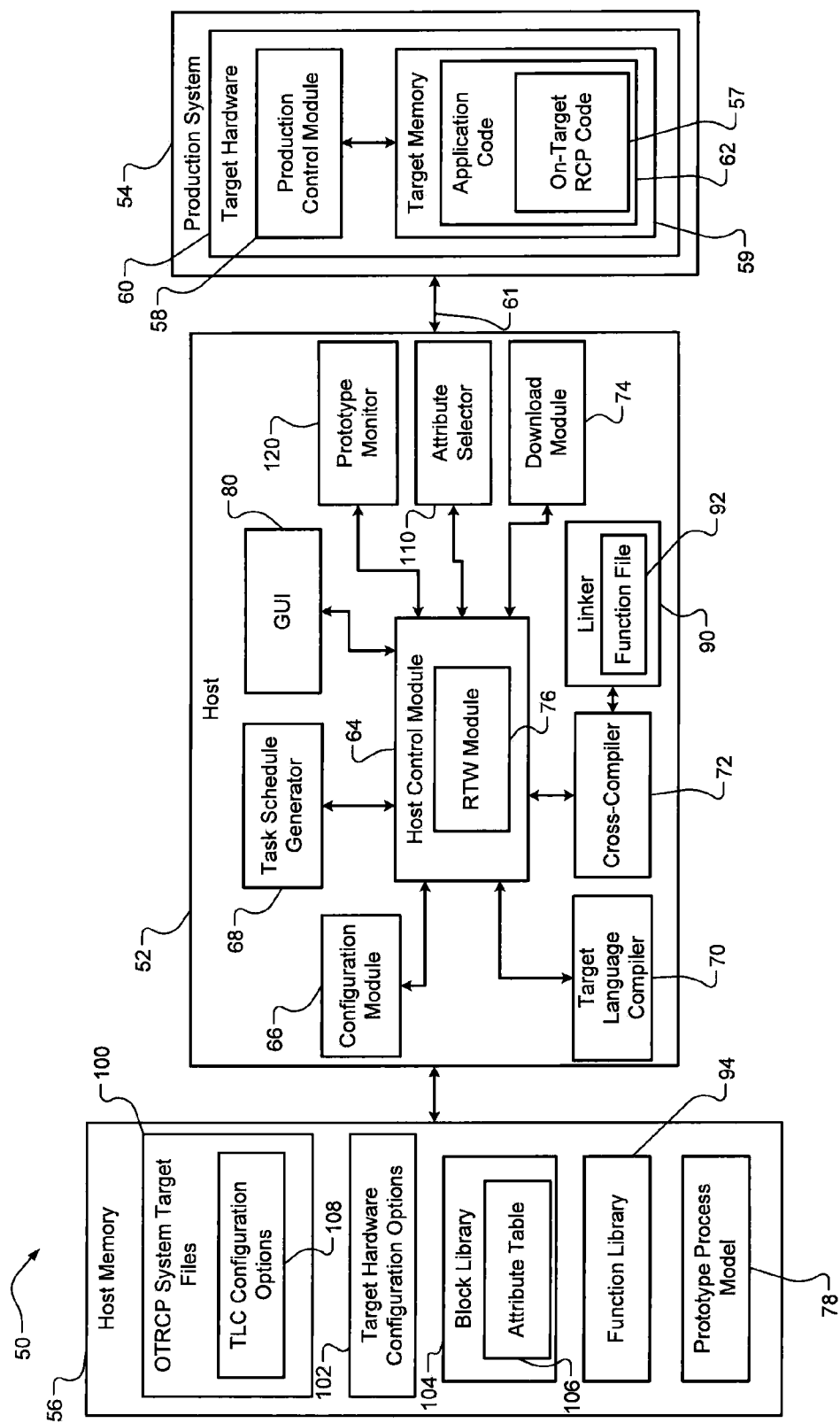
FIG. 2 is a functional block diagram of an on-target RCP system in accordance with an embodiment of the present disclosure.

In FIG. 2, an on-target RCP system 50 is shown. The on-target RCP system 50 includes a host 52 that communicates with a production system 54 and a host memory 56. The host 52 may operate in an on-target RCP network, such as the on-target RCP network 10 of FIG. 1. The host 52 is separate from the production system 54. The host 52 generates an on-target RCP code 57, which is downloaded to a production (target) control module 58 and/or target memory 59 of target (production) hardware 60 of the production system 54. The production control module 58 may include the target memory 59. The host 52 communicates with the production control module 58 via a wired or wireless communication link 61.

The production control module 58 may include a microcontroller, such as a Freescale™ snake family microcontroller with a digital signal processing engine. The on-target RCP code 57 may be stored in a reserved location in the target memory 58. The target memory 58 may, as an example, include non-volatile memory and/or flash memory. The on-target RCP code 57 may be incorporated into an application code 62 that is stored on the target memory 59. The application code 62 may include the control logic used in operation of the production system 54.

The host 52 may include a host control module 64, a configuration module 66, a task schedule generator 68, a target language compiler (TLC) 70, a cross-compiler 72, and a download module 74. The host control module 64 includes a real-time workshop (RTW) module 76 that executes a RTW or build program, such as a RTW provided by Matlab™, for the generation of the on-target RCP code 57. A developer may develop a prototype process model 78 via a RTW, such as that provided by Simulink™, which builds on the RTW of Matlab™. The prototype process model 78 may be developed in an environment for multi-domain simulation and model-based design for dynamic and embedded systems. The RTW used to build the prototype process model 78 may provide an interactive graphical environment and a customizable set of block libraries. The block libraries may be used to design, simulate, implement, and test a variety of time-varying systems, including communications, controls, signal processing, video processing, and image processing systems. Example block libraries are described below. A GUI 80 is provided for viewing, configuring, generating, and testing of the prototype process model 78. The prototype process model 78 is built into an executable image by a RTW tool and is stored in the host memory 56.

Figure 5:
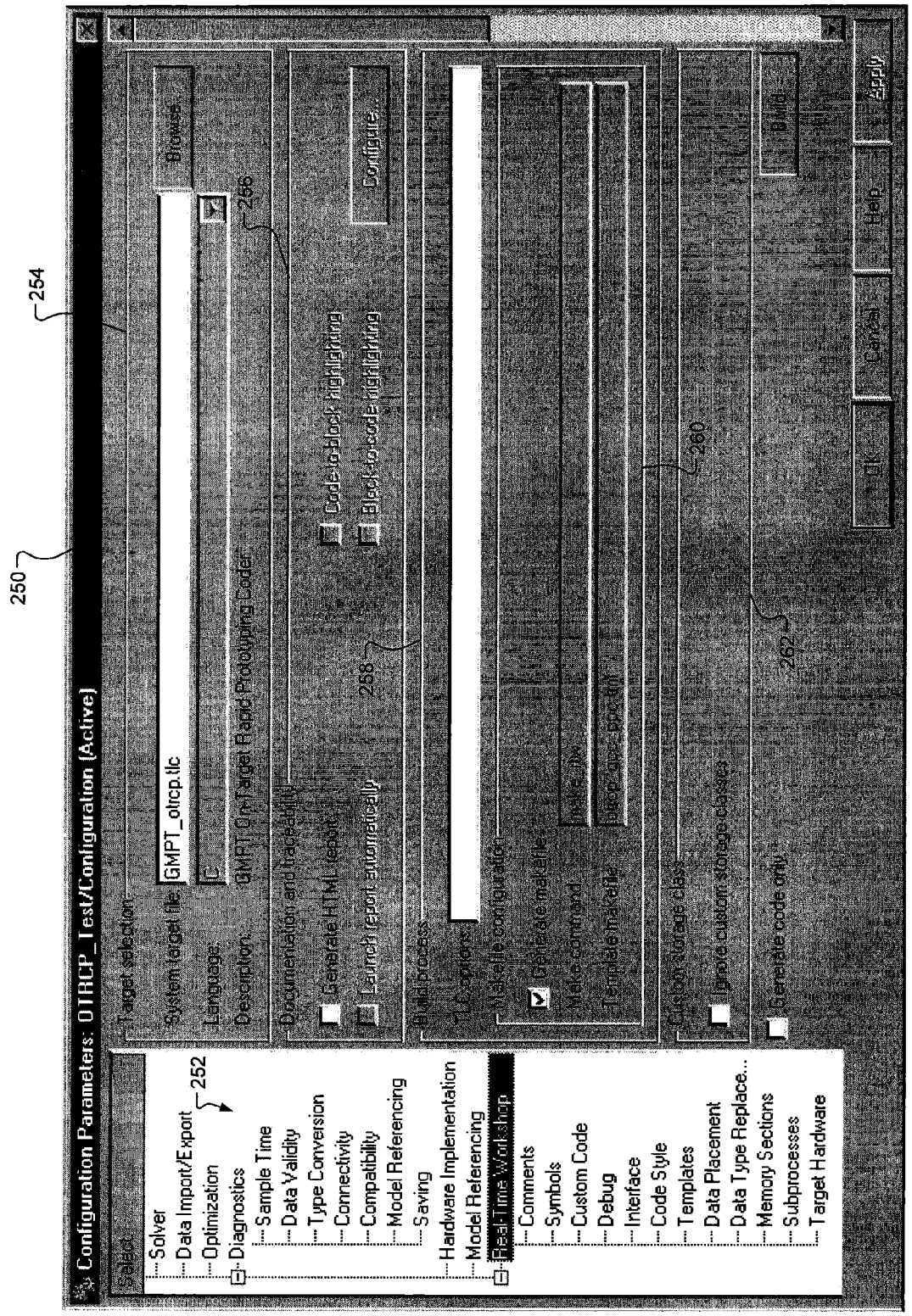
FIG. 5 is an graphical user interface (GUI) initialization window for generation of an on-target RCP model in accordance with an embodiment of the present disclosure.
Figure 6:
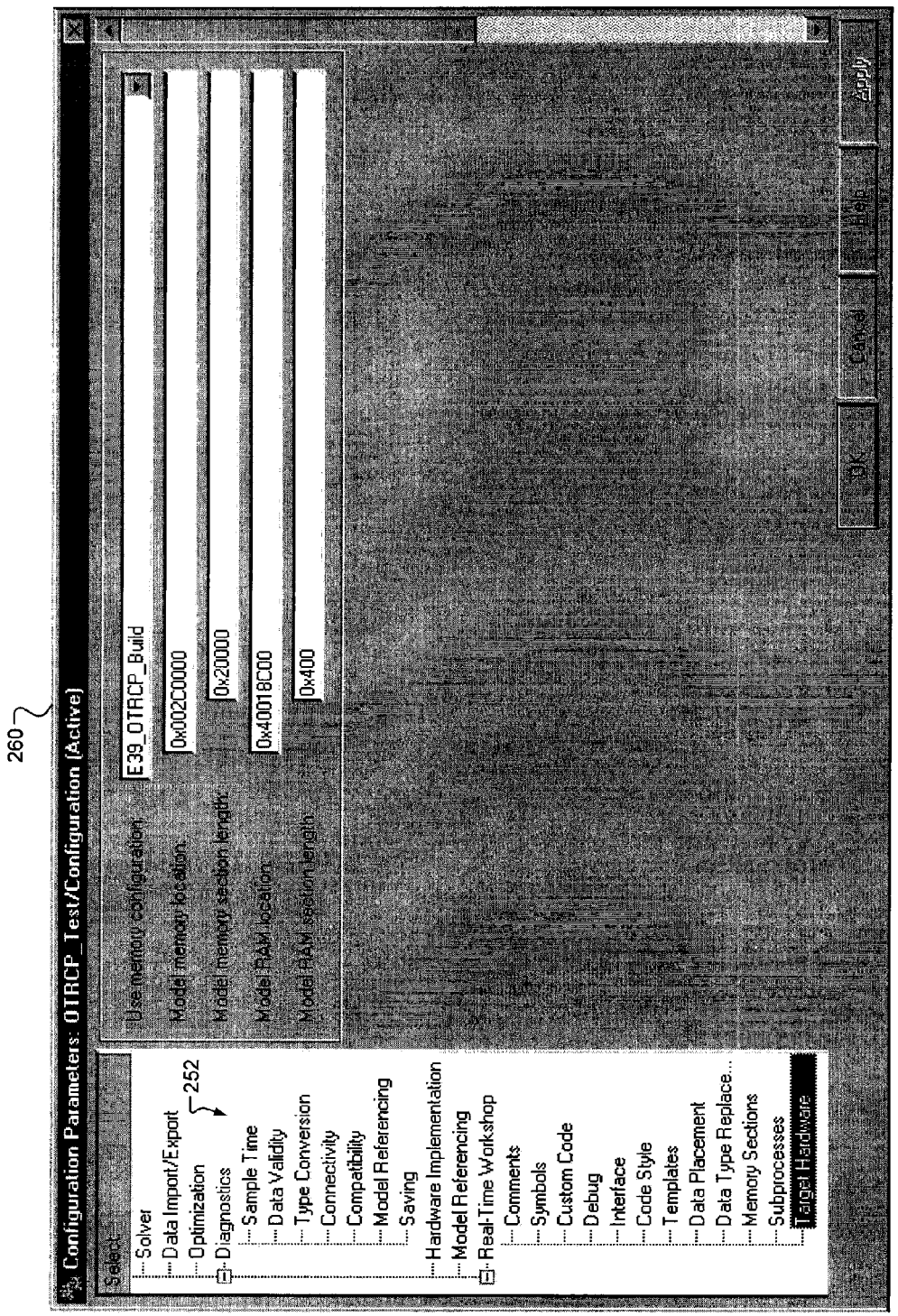
FIG. 6 is a memory configuration window in accordance with an embodiment of the present disclosure.
Figure 7:
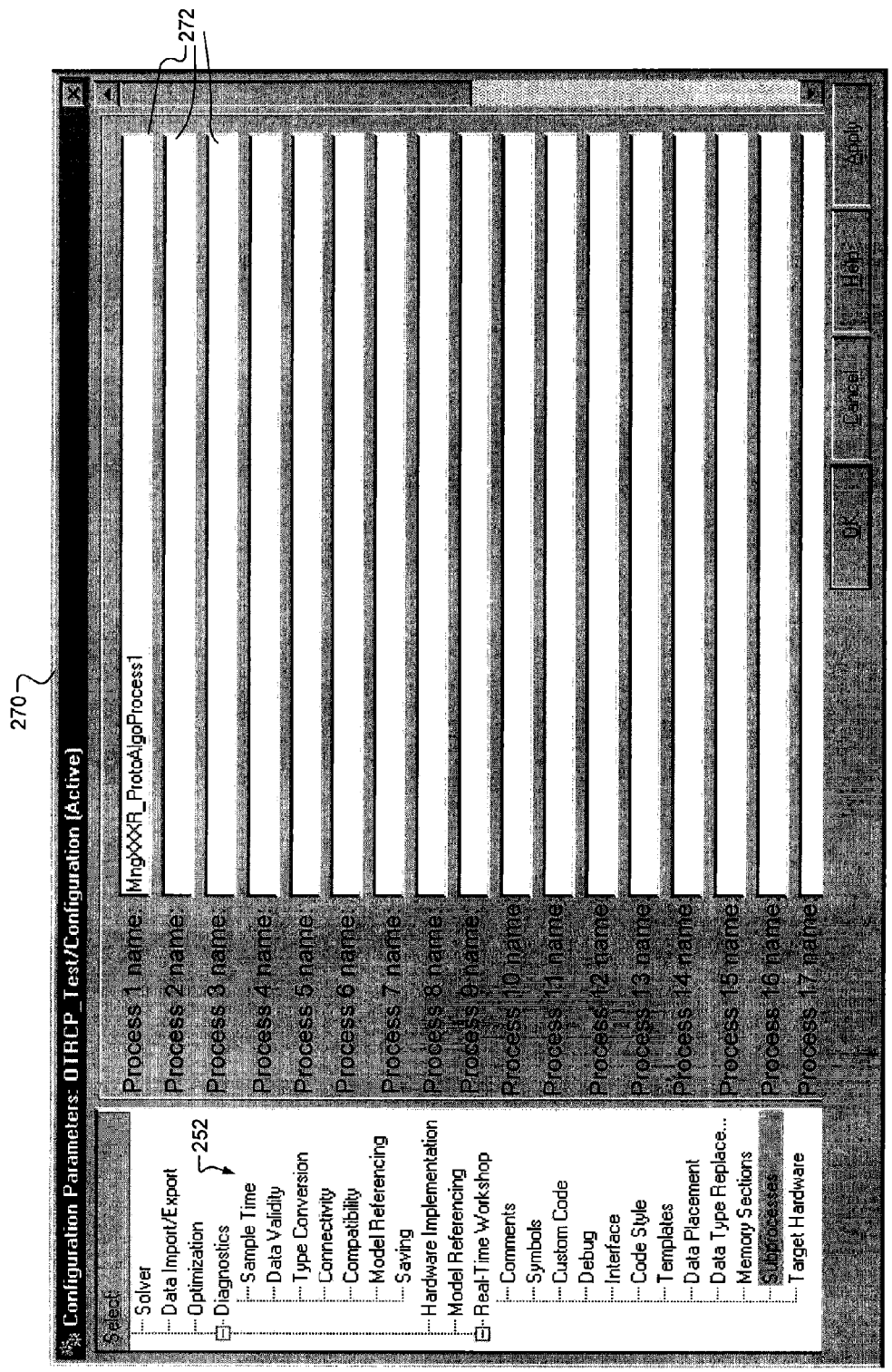
FIG. 7 is a on-target RCP process window in accordance with an embodiment of the present disclosure.

The configuration module 66 may also be part of the RTW module 76 and configure the TLC 70 and the cross-compiler 72 for the generation of object code that is executed on a particular production control module. Example GUI configuration windows are shown in FIGS. 5 and 6. The task schedule generator 68 may be part of the RTW module 76 and may be used to schedule on-target RCP processes 81. An example GUI window for the entering of prototype processes is shown in FIG. 7.

Once generated, the prototype process model 78 is compiled by the TLC 70 to generate source code, such as C-code. The cross-compiler 72 compiles the source code to generate object code or code that may be executed on the production control module 58. Example cross-compilers that may be used and/or modified for use are GNU compilers, such as a cross-compiler from the GNU Compiler Collection (GCC). An example GNU cross-compiler for PowerPC™ microcontrollers with synergistic processing element (SPE) feature support is the PowerPC-eacbispe cross-compiler. The cross-compiler 72 may be coupled to or include a linker 90, which modifies the source code or the object code to replace function names with function names, addresses, etc. that are recognizable to the production control module 58. The linker 90 may receive and/or store a function file 92 from the production control module 58 or from a function library 94 of the host memory 56. The function file 92 may include a list of available functions associated with the production control module 58 and associated conversions.

Once cross-compiled, the executable code is downloaded to the production control module 58 and/or stored in the target memory 59 via the download module 74. The download module 74 may download the executable code in a similar manner used to download production control software or the application code 62. The executable code may be used to replace a portion of the application code 62 and/or may be used to add functionality to the application code. The download module 74 may include, for example, integrated calibration and acquisition tools and use a flash configuration format, such as ProF.

During generation of the on-target RCP code, the host control module 64 may access various items stored in the host memory 56. The items may include the function library 94, an on-target RCP system target file 100, target hardware configuration options 102, a block library 104 with an attribute table 106, etc. The RTW builds are configured through the specification of the system target files 100, which may specify TLC configuration options 108. The on-target RCP system target files 100 provide a basis on which a prototype process model or an on-target RCP process model may be generated.

The on-target RCP system target files 100 may be associated with one or more production control modules, which may have similar configurations. Example selection of an on-target RCP system target file is shown in FIG. 5. The on-target RCP system target files 100 may include the target hardware configuration options 102, examples of such options are shown in FIG. 5. The production control modules may have associated memories with different memory maps for different production target hardware. The specific configuration of the memory for the target hardware 60 may be specified by the target hardware options 102.

Figure 8:
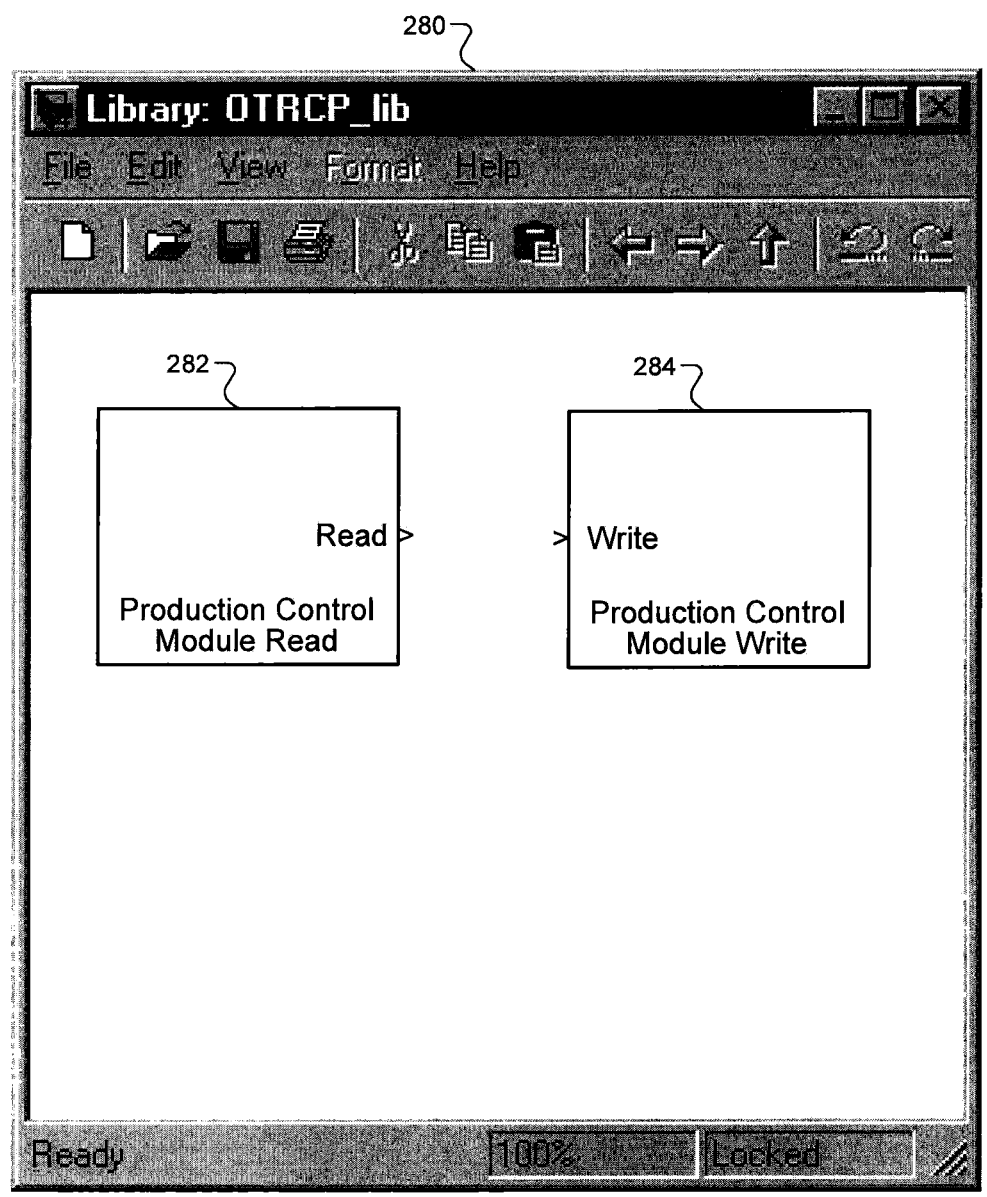
FIG. 8 is a block library window in accordance with an embodiment of the present disclosure.

The block library 104 includes a list of function blocks, which may be selected and used in a prototype process model. Each function block has an associated function or set of functions. Example function blocks may include a read block, a write block, a gain block, a proportional integral derivative (PID) block, a summation block, etc. An example block library illustrating read and write selectable function blocks is shown in FIG. 8. Example read and write function blocks are shown in FIGS. 9A and 10A.

The attribute table 106 includes a list of attributes associated with each function block in the block library 104. The attributes of a function block may be created, modified, added or removed by a developer. The attributes may be stored in an attribute file and may be selected via, for example, a pull-down window by the developer. The attribute file may have an ASAP2 file format, which describes software objects used by software calibration tools. The attributes for a function block may include for, example name, address, data type, etc. As an example, the attribute table 106 may relate each of the attributes with an address of the target memory 59 where a corresponding value for that attribute is stored. An attribute selector 110 may be used when accessing the attribute table 106.

The function library 94 includes a table of functions available for each of one or more available production control modules. The functions refer to a task or set of tasks that are performed by the production control module. The on-target RCP code may call a function to be performed. The function may receive and output values. For example, the on-target RCP code 57 may identify a particular function with reception variables A and B and output variable C. Control may branch to a first line of code associated with the called function. The first line of code has an associated address in the target memory 59, which may have been provided by the linker 90 during generation of the executable code. The function may have a set of instructions that are performed based on A and B to provide output C, which is returned to a module executing the on-target RCP code.

The linker 90 allows a prototype process to use infrastructure library functions that are stored on the production control module 58 and/or target memory 59 and/or built into the application code 62. The use of the functions of the production control module 58 and target memory 59 minimizes length of the on-target RCP code 57 and memory usage of the target memory 59. The linker 90 provides addresses for selected functions that are stored in the target memory 59. The linker 90 may be provided with the addresses of the functions before or during the generation of the executable code.

Figure 4:
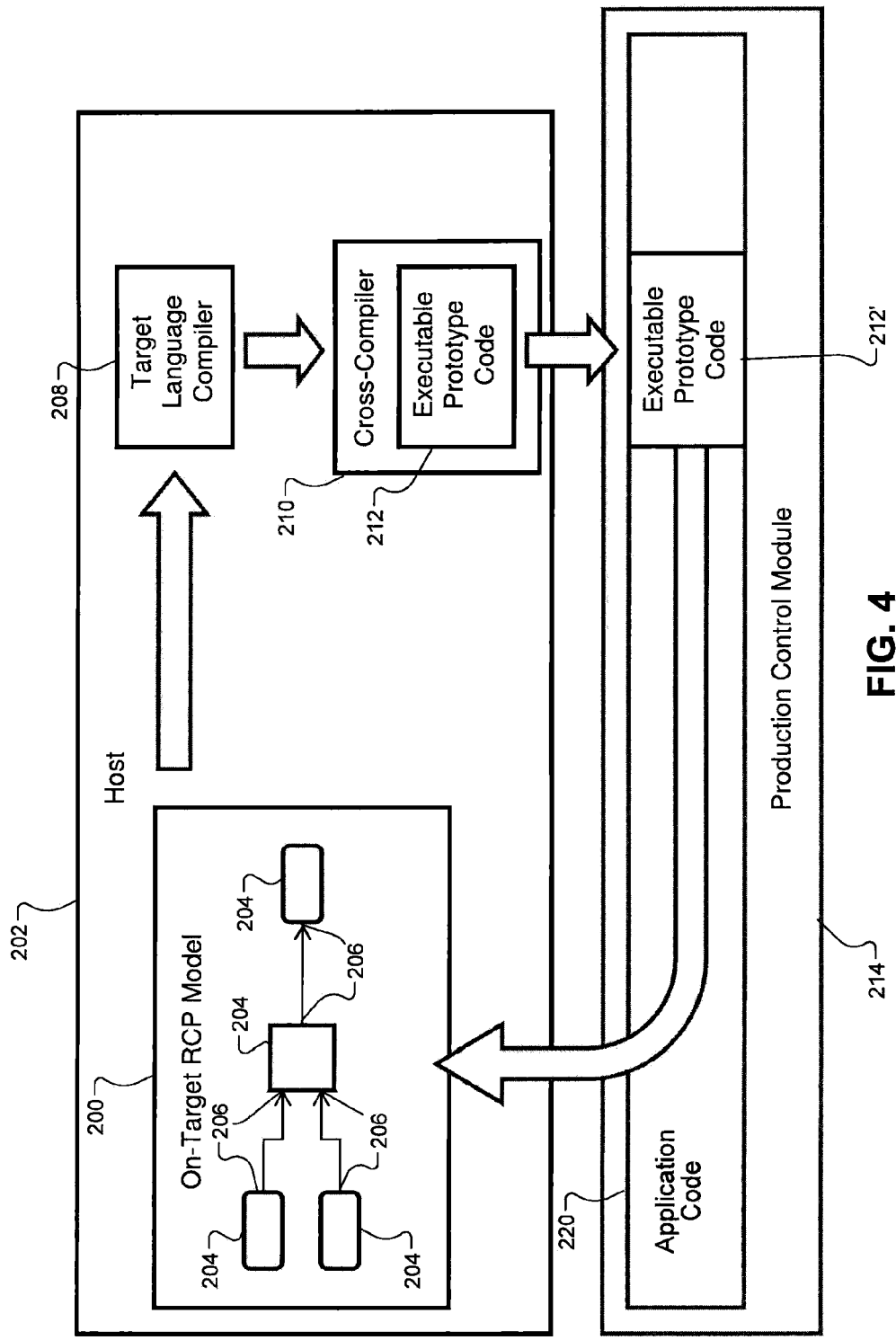
FIG. 4 is an on-target RCP process diagram illustrating a prototype code build and on-target RCP model modification in accordance with an embodiment of the present disclosure.

The host 52 may further include a prototype monitor 120. The prototype monitor 120 may monitor operation of the production system 54. The prototype monitor 120 may communicate with, for example, a status output module of the production control module 58, as shown in FIG. 4, and/or may monitor preselected values stored at predetermined addresses of the target memory 59. The host control module 64 may provide a GUI evaluation window illustrating operation of the production system 54 and/or I/O states of the function blocks associated with the on-target RCP code 57. The GUI evaluation window may indicate sensor states, actuator states, control module states, etc. of the production system 54.

Figure 3:
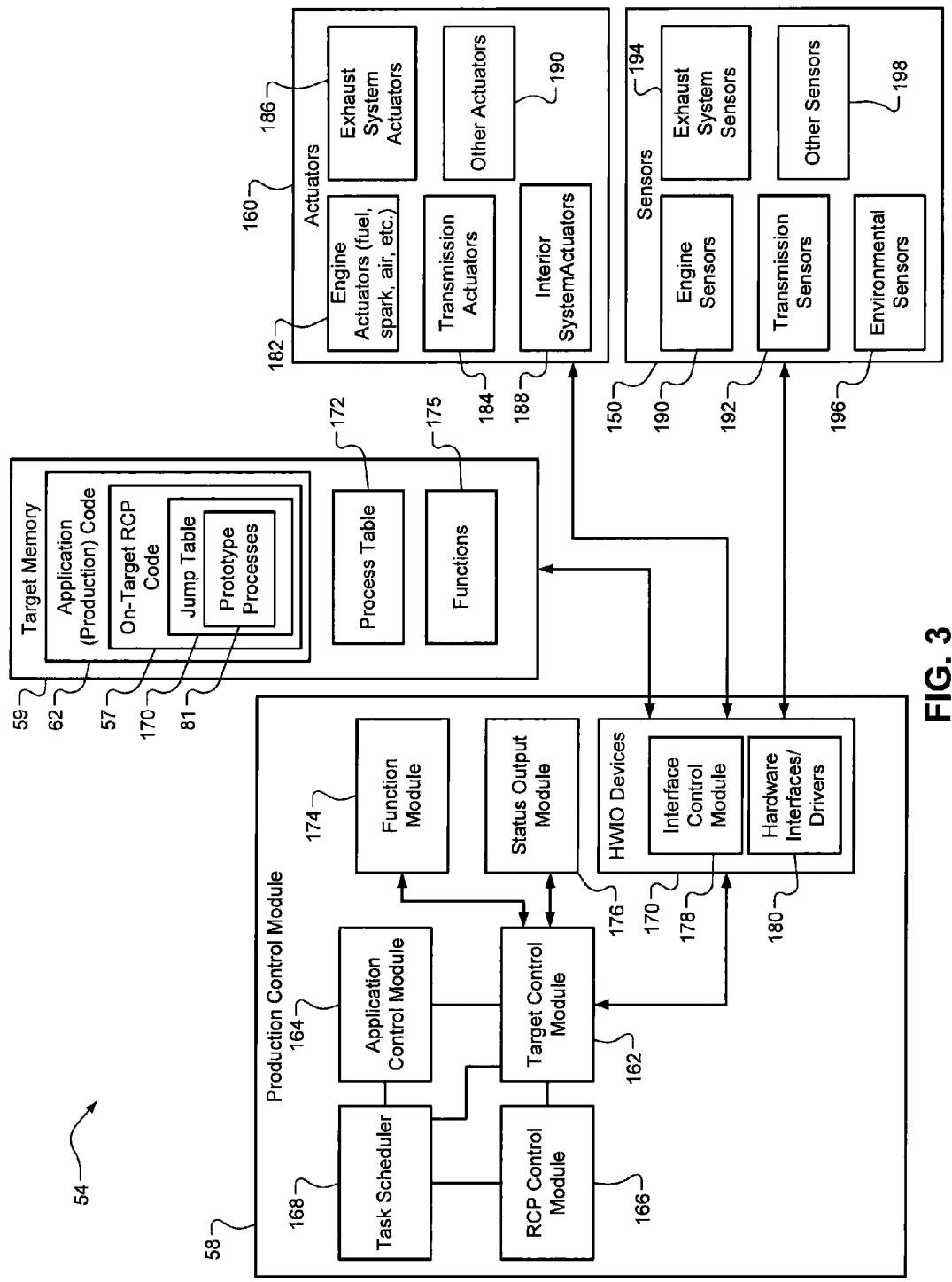
FIG. 3 is a functional block diagram of a production system of FIG. 2.

In FIG. 3, the production system 54 is shown incorporating the production control module 58. The production control module 58 is configured to execute the on-target RCP code 57 and communicates with the target memory 59, sensors 150, and actuators 160. The production control module 58 may include a target control module 162, an application control module 164, a RCP control module 166, a task scheduler 168 and hardware input and output (I/O) devices 170. The target control module 162 may control operation of the application control module 164 and the RCP control module 166.

Figure 11:
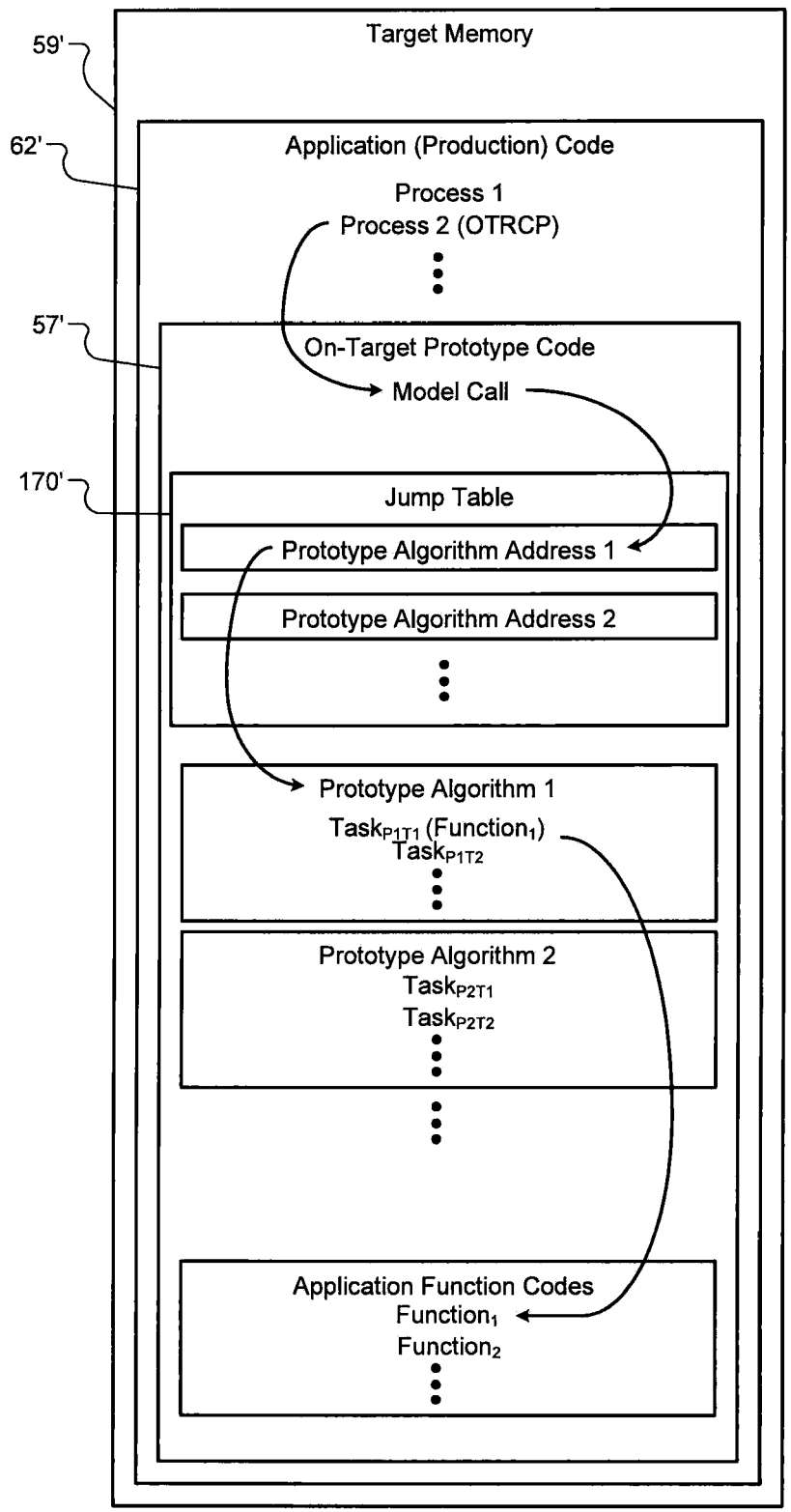
FIG. 11 is a block diagram of a target memory illustrating use of a jump table in accordance with an embodiment of the present disclosure.

The application control module 164 may execute the application code. The RCP control module 166 may execute the prototype code including prototype processes stored in a jump table 170 of the target memory 59. An example jump table is shown in FIG. 11. The task scheduler 168 may sequentially perform processes and/or tasks listed in a process table 172, which is stored in the target memory 59. An example on-target RCP process window listing on-target prototype processes is shown in FIG. 7.

The production control module 58 may perform as a digital signal processor (DSP) and/or may include a DSP engine. The production control module 58 may further include a function module 174 that maintains a list of available functions 175 stored in the target memory 59. The function list may be provided to, for example, the host 52 of FIG. 3 based on reception of a request signal from the host 52.

The production control module 58 may include a status output module 176, which is used to monitor states of the sensors 150 and actuators 160, as well as states of the target control module 162, the application control module 164 and the RCP control module 166.

The HWIO devices 170 may include an interface control module 178 and hardware interfaces/drivers 180. The interface control module 178 provides an interface between the target control module 162, the application control module 164, the RCP control module 166, and the hardware interfaces/drivers 180. The hardware interfaces/drivers 180 control operation of various actuators 160. Example actuators for a vehicle application are engine actuators 182, such as fuel injectors, fuel pumps, ignition devices, air flow control devices, and other engine system devices. The other engine system devices may include ignition coils, spark plugs, throttle valves, solenoids, etc. The actuators 160 may also include transmission actuators 184, exhaust system actuators 186, interior system actuators 188 and other actuators 190. The hardware interface/drivers 180 also receive sensor signals, which are communicated to the respective control modules of the production control module 58 and/or of the host 52. The sensor signals for a vehicle application may include engine sensors 190, transmission sensors 192, exhaust system sensors 194, environmental sensors 196, and other sensors 198. The sensors may include a speed sensors, temperature sensors, pressure sensors, flow sensors, etc.

In FIG. 4, an on-target RCP process diagram is shown illustrating a prototype code build and on-target RCP model modification. During an on-target RCP process an on-target RCP model or prototype model 200 is generated, for example, on a host 202. The prototype model 200 includes selected blocks 204 with corresponding inputs and outputs 206. The blocks 204 are arranged and connected as designed by a developer, set as a default, or provided as part of a template or previously stored model. Templates and/or preformed models may be stored and retrieved from memory when forming a new prototype model.

When a prototype model is built, the prototype model is provided to a TLC 208 to generate a source code. The source code is provided to a cross-compiler 210 to generate an executable code (object code) 212. The executable code 212 is downloaded (flashed) onto a production control module 214 and/or a target memory associated with the production control module 214. The executable prototype code 212 may be stored into a reserved location on the production control module 214 and/or the target memory. The reserved location may be within a location associated with an application code 220 or may be stored separate from the application code 220. Tasks of the executable prototype code 212 may be executed sequentially with tasks of the application code 220. Tasks of the executable prototype code 212 may be called during execution of the application code 220 or may be executed independent of the application code 220.

During execution of the executable prototype code 212 the host 202 may monitor and evaluate states of the corresponding production system. The on-target RCP model may be modified based on the states of the production system and the evaluation outputs generated by a prototype monitor of the host 202. The modification may be performed based on inputs received from a developer.

In FIG. 5, an initialization window 250 for generation of an on-target RCP model is shown. The initialization window 250 may include a column tree 252 that allows for the selection of a set of configuration options. The initialization window 250 includes options associated with the selection of a RTW heading in the column tree 252. RTW configuration options may include target selection options 254, documentation and traceability options 256, build process options 258, custom storage class options 260, and generate code only options 262.

When an on-target RCP model is built an initial system target file or TLC file may be selected. The TLC file specifies how to build a prototype algorithm to execute on a particular production control module or controller. The TLC file determines the structure of code generated. The TLC file may set the format and type of code generated. An example TLC file is shown and identified as GMPT_otrrcp.tlc. This file may be associated with on-target RCP for predetermined control modules. The TLC options may include a variable value setting option and a template selector option. Commands or code settings may be entered in a TLC options field. For example, variables may be assigned values by entering commands in the TLC options field.

An on-target RCP process model may be generated based on templates. A template may be identified in the makefile configuration options associated with the on-target system target file. The makefile configuration options may allow a developer to select a template, which is used to generate a program for a particular target and/or compiler.

In FIG. 6, a memory configuration window 260 for inputting a memory configuration associated with a production control module is shown. In the column tree 252, a target hardware heading may be selected under the RTW heading. The target hardware heading when selected may provide selectable options, for example, memory of a target, such as a target memory of a production system.

The selectable options may include a use memory configuration option, a model memory location option, a model memory section length option, a model RAM location option, and a model RAM section length option. A developer may input the names, locations and lengths for the options in the memory configuration window 260. This identifies a particular target memory that is to store an executable code generated based on an on-target RCP code. The use memory configuration option may be selected through the use of a pull-down window that lists available production controllers for which system target files have been created. The other options may also be selected via respective pull-down windows.

In FIG. 7, an on-target RCP process window 270 for selecting on-target RCP processes to download to a production control module is shown. Execution of the on-target RCP process model may be controlled through function calls scheduled by a task scheduler, such as the task scheduler 168. A target control module, an application control module and a RCP control module may have a series of tasks to be performed in addition to tasks associated with the on-target RCP process model. The task scheduler may schedule tasks associated with the on-target RCP process model, as well as tasks associated with other processes. The tasks may be scheduled for execution at existing rates available in software of a production system or production control module.

Subprocess scheduling may be selected under the RTW heading in the column tree 252. The subprocesses may provide process options and process slots available. In the embodiment shown, a developer may, for example, enter prototype process names in option fields. The prototype process names may be entered in order of desired execution. Algorithms or tasks associated with the prototype processes may be performed sequentially as entered in the on-target RCP process window by a production control module. Each process slot may correspond to a specific execution rate. The processes may be performed sequentially as entered in the on-target RCP process window or may be scheduled based on execution rates associated with each process and/or slot. Slots 272 are shown in which processes and/or tasks may be identified by name. The slots may be referred to as process or task slots.

In FIG. 8, a block library window 280 is shown. The block library window 280 as shown includes a read function block 282 and a write function block 284. The on-target RCP process model may read and write control data from and to a target memory, which may be used by software of a production control module. A developer interface may be provided for the read and write blocks 282, 284 as shown in FIGS. 9A and 10A. The attributes of the read and write blocks 282, 284 may be changed using, for example, the attribute selector 110 of FIG. 2.

Figure 9B:
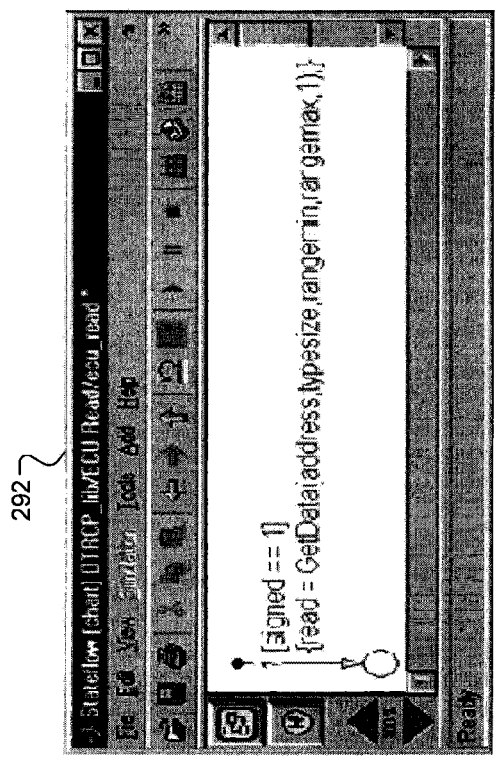
FIG. 9B is a stateflow window that illustrates a read request in accordance with an embodiment of the present disclosure.
Figure 9A:
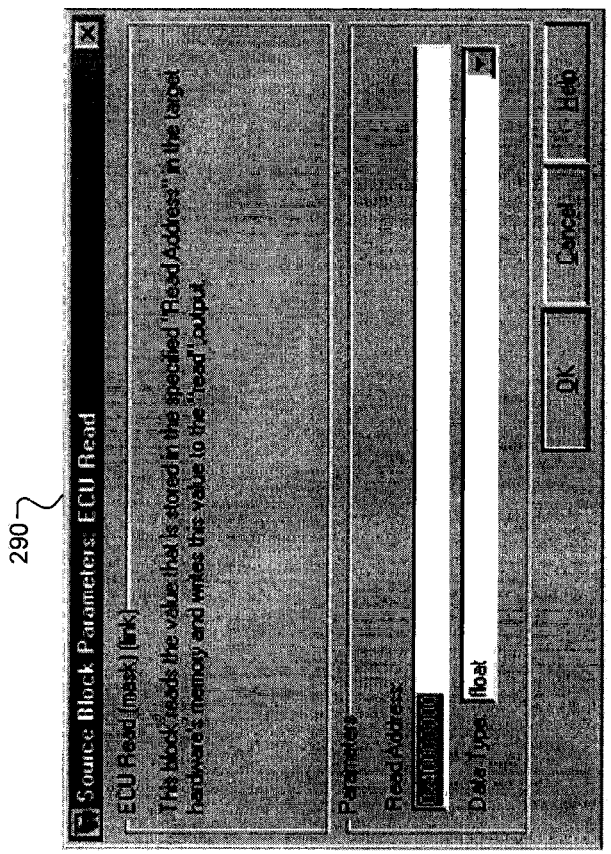
FIG. 9A is a read window in accordance with an embodiment of the present disclosure.

In FIGS. 9A and 9B, a read window 290 and a stateflow window 292 that illustrates a read request are shown. The read function block is a masked subsystem which passes data attributes specified in a mask of the read function block to a read function, such as GetData. GetData is a custom function that may be provided for C-code. Production software data attributes may be passed to the GetData function to perform a memory read operation. The read function is a software hook built into a prototype algorithm code or an on-target RCP code.

For example only, the read window 290 has a read address attribute and a data type attribute. The read address attribute may be entered by a developer and specify an address of a target memory of a production system where control data is to be read. The address may be, for example, an eight-digit hexadecimal number with or without a formatting prefix (e.g. 0x1234ABCD or 1234ABCD, where 0 is the formatting prefix). The data type attribute may be entered by the developer and specify the type of the control data, such as floating or non-floating data. The attributes may be passed to a read function, such as the GetData function.

The stateflow window 292 provides an example GetData function statement in C-code. The GetData function gets data at a requested address ("address"). The GetData function may specify the type size ("typesize"), minimum value ("rangemin"), and maximum value ("rangemax") of the data retrieved and whether the data is signed or unsigned ("1"). Signed data refers to positive and negative data. The minimum value and the maximum value are used to respectively set lower and upper limits for the data. When the data is less than the minimum value, the retrieved value is equal to the minimum value. When the data is greater than the maximum value, the retrieved value is equal to the maximum value. A "1" may indicate that the data is signed, whereas a "0" may indicate that the data is unsigned.

Figure 10B:
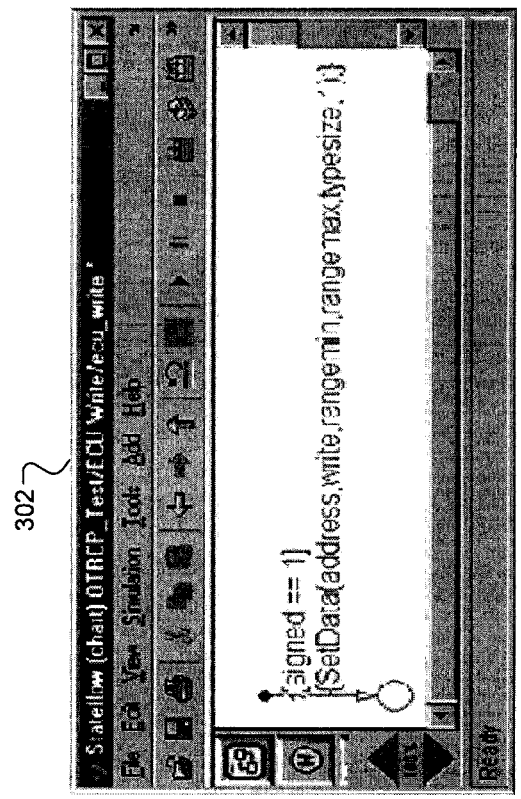
FIG. 10B is a stateflow window that illustrates a write request in accordance with an embodiment of the present disclosure.
Figure 10A:
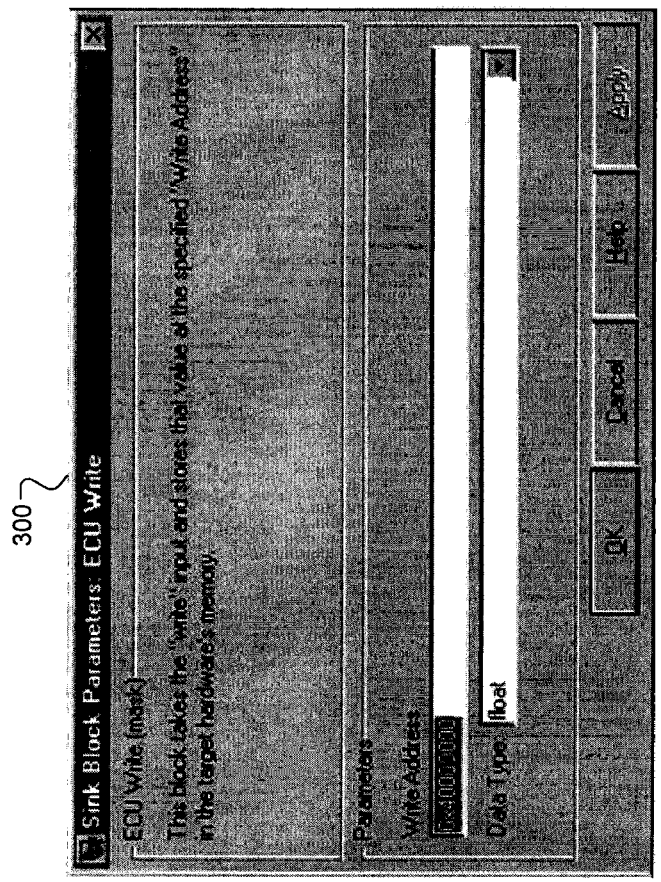
FIG. 10A is a write window in accordance with an embodiment of the present disclosure.

In FIGS. 10A and 10B, a write window 300 and a stateflow window 302 that illustrates a write request are shown. The write function block is a masked subsystem which passes data attributes specified in a mask of the write function block to a write function, such as SetData. SetData is a custom function that may be provided for C-code. Production software data attributes may be passed to the SetData function to perform a memory write operation. The write function is a software hook built into a prototype algorithm code or the on-target RCP code.

For example only, the write window 300 has a write address attribute and a data type attribute. The write address attribute may be entered by a developer and specify an address of a target memory of a production system where control data is to be stored. The address may be, for example, an eight-digit hexadecimal number with or without a formatting prefix (e.g. 0x1234ABCD or 1234ABCD, where 0 is the formatting prefix). The data type attribute may be entered by the developer and specify the type of the control data, such as floating or non-floating data. The attributes may be passed to a write function, such the SetData function.

The stateflow window 302 provides an example SetData function statement in C-code. The SetData function stores data at a requested address ("address"). The SetData function may specify the type size ("typesize"), minimum value ("rangemin"), and maximum value ("rangemax") of the data retrieved and whether the data is signed or unsigned (e.g. "1"). Signed data refers to positive and negative data. The minimum value and the maximum value are used to respectively set lower and upper limits for the data. When the data is less than the minimum value, the stored value is equal to the minimum value. When the data is greater than the maximum value, the stored value is equal to the maximum value. A "1" may indicate that the data is signed, whereas a "0" may indicate that the data is unsigned.

In FIG. 11, a target memory 59' is shown illustrating use of a jump table 170'. The target memory 59' may store an application code 62', an on-target RCP code 57', and the jump table 170'. The application code 62' may refer to and/or include a production ready code that is used by a production control module when performing tasks. The on-target RCP code 57' may refer to code that is developed and downloaded to a production control module using on-target RCP techniques disclosed herein. The on-target RCP code 57' may include one or more prototype processes that may function independently or dependently of each other. The on-target RCP code 57' may be stored in a reserved location on the target memory 59' and may be stored as part of the application code 62'.

The on-target RCP code 57' may include a model call. The model call may refer to a subroutine that calls an address of an on-target RCP process code associated with a particular prototype algorithm (e.g. prototype algorithm 1) to be executed. For example, a production control module may execute processes in a particular order. In the embodiment shown, process 2 is performed after process 1. When process 2 is initiated, the model call subroutine looks-up the address associated with the prototype algorithm to be executed. Control then proceeds to execute tasks beginning at the looked-up address. This may include the execution of one or more functions, as shown. For example only, a first prototype algorithm 1 has tasks $\text{Task}_{p1t1}$, $\text{Task}_{p1t2}$, ..., where $\text{Task}_{p1t1}$ calls a first function $\text{Function}_1$. A "call", for example, refers to a "goto" or a transfer to a particular address that is not of succession with an address of a current task. During a call, a set of instructions may be performed. After the set of instructions are performed, control may return to a task that is successive to the task performed prior to the call.

When an on-target RCP process is developed, the addresses where the process is to be stored and the code length of the processes are unknown. The use of a model call subroutine and a jump table allow for the storage of on-target RCP code of different code lengths to be stored and executed. The storage location, the address of the first line of code, and/or the length of the on-target RCP code for each protoytype algorithm may be determined after the generation of an on-target RCP model. The addresses associated with the prototype algorithms may be specified in the tasks slots of the on-target RCP process window or may be predetermined and/or allocated to each of the tasks slots.

The model call subroutine may be called by a RCP control module, such as the RCP control module 166. The model call subroutine may be called when a task or process of the task scheduler 168 is executed.

Figure 12:
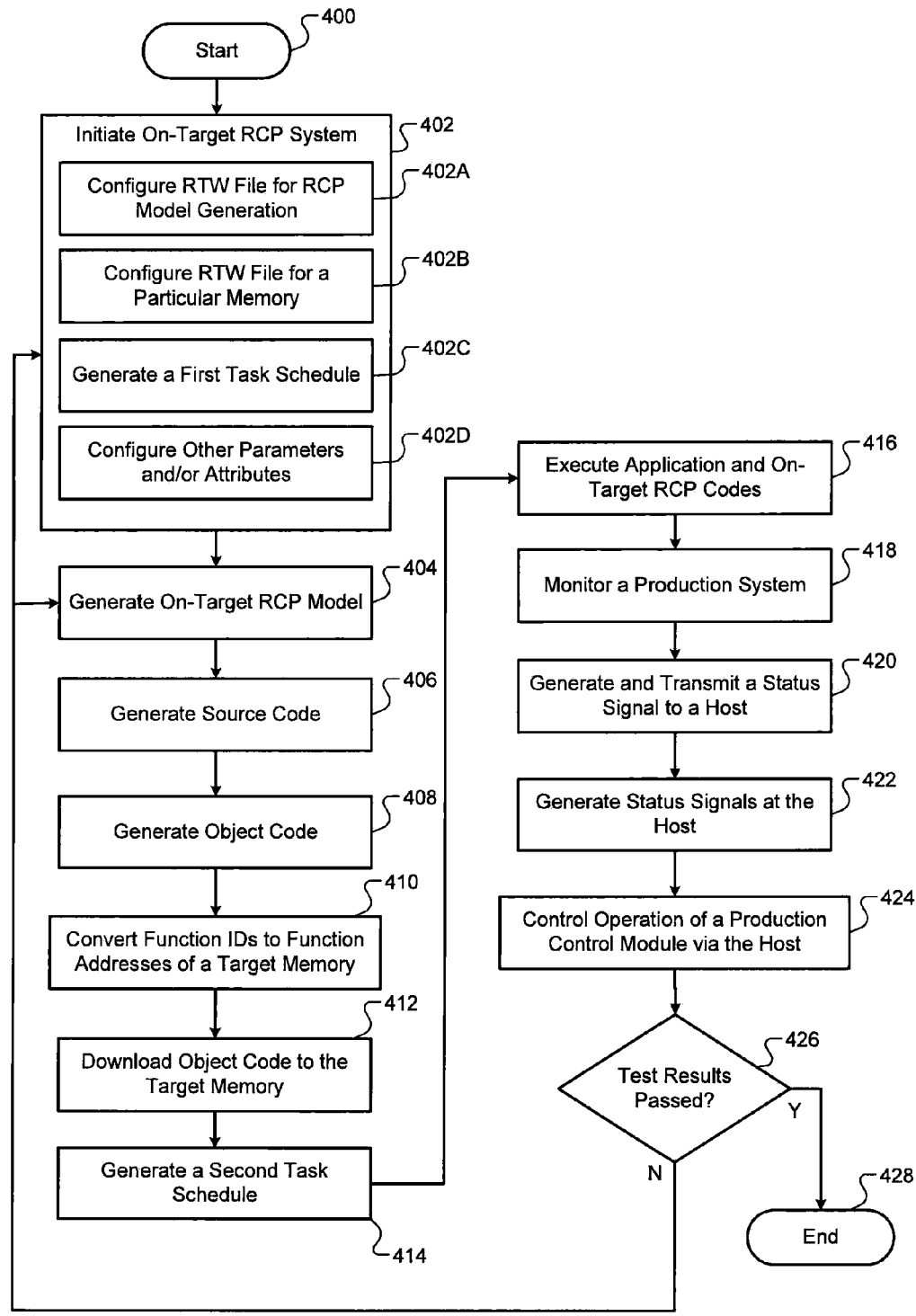
FIG. 12 illustrates an on-target RCP method in accordance with an embodiment of the present disclosure.

FIG. 12 illustrates an on-target RCP method. Although the following steps are primarily described with respect to the embodiments of FIGS. 2-11, the steps may be modified to apply to other embodiments of the present invention. The method may begin at step 400. In step 402, the on-target RCP system 50 is initiated. The host control module 64 or the configuration module 66 of the host 52 opens configuration parameter windows, such as the windows opened in steps 402A-402C to set configuration parameters and/or attributes. In step 402A, the initialization window 250 may be opened to configure a RTW file for RCP model generation. The host control module 64 and/or the configuration module 66 may select the production control module 58 from a list of production control modules stored in the host memory 56. Attribute options of the initialization window 250 may be selected, entered, and/or modified. For example, a system target file may be selected, TLC options may be entered, on-target RCP templates may be selected, etc.

In step 402B, the memory configuration window 260 may be opened to configure the RTW file for a particular memory of target. Memory configuration attributes may be entered, selected and/or modified including selection of a target memory 59. In step 402C, the on-target RCP process window 270 may be opened to select on-target RCP processes and/or tasks and the order in which the processes and/or tasks are to be performed. The task schedule generator 68 may generate a first task schedule based on the selected order.

In step 402D, other configuration windows may be opened for the entering, selecting, and/or modifying of additional attributes for the configuring of other parameters and/or attributes. The other configuration windows may include a comments window, a symbols window, a custom code window, a debug window, a code style window, a templates window, a data placement window, a data type replacement window, and a memory sections window. The other configuration windows are identified in the column tree 252 of FIGS. 5-7.

In step 404, a RTW window is opened for the selection and connection of function blocks in the function library 94 to generate an on-target RCP model. The function blocks may refer to functions stored in the target memory 59. A developer may select and/or create function blocks to be used in a current on-target RCP process under development. The function blocks are connected to form an on-target RCP process model that is a symbolic model and represents an algorithm and/or math model. The function blocks available and the build of the on-target RCP model may be based on the system target file and the TLC options. This may be determined by the host control module 64, which may then affect the build of the on-target RCP model by the host control module 64.

The attribute selector 110 may be used to select attributes for the selected function blocks. New attributes may be created for each of the function blocks and then stored in the attribute table 106. Source code that is generated in step 406 is based on the selected and created attributes.

In step 406, on-target RCP process models including the on-target RCP process model of step 404 is compiled along with the task schedule by the TLC 70 to generate a source code, such as C-code. The TLC 70 may compile just the on-target RCP process model or may compile multiple on-target process models. The TLC 70 may generate the source code based on the selected production control module and the attributes identified in the configuration windows of step 402.

In step 408, the cross-compiler 72 compiles the source code to generate object code that is executable on the production control module 58 of the production system 54. The cross-compiler 72 may generate the object code based on the selected production control module 58 and the attributes identified in the configuration windows of step 402.

In step 410, the linker 90 converts function identifiers in the source code to function addresses associated with functions stored in a target memory 59 of the production system 54. The linker 90 may convert the function identifiers before or during cross-compiling of the source code. Step 410 may be performed before or during step 408.

In step 412, a download module 74 performs an on-target download of the object code from the host 52 to the production control module 58 and/or the target memory 59. This may include the flashing of the object code onto the target memory

59. The object code may be directly downloaded from the host 52 to the production control module 58 via the communication link 61 without use of intermediate computers or logic devices.

In step 414, the task scheduler 168 may generate a second task schedule based on the first task schedule.

In step 416, the target control module 162, the application control module 164, and/or the RCP control module 166 execute an application code and the object code or on-target RCP code based on the selection and order provided in step 402C. The application code and the on-target RCP code may have associated software rings, which each include a set of executable instructions or code lines. The application control module 164 may execute the application code. The RCP control module 166 may execute the on-target RCP code. The target control module 162 may control operation of the production system based on the execution of the application code and the on-target RCP process code. The target control module 162 may control operation of an engine, a transmission, an exhaust system, a vehicle electronic control system, etc. based the execution of the application and on-target RCP process codes.

The application control module 164, the target control module 162 and the on-target RCP control module 166 may perform a model call when executing processes and/or tasks. For example, the on-target RCP control module 166 may perform a model call to obtain an address of the on-target RCP process code for a particular algorithm to be performed. The on-target RCP control module 166 may refer to the jump table 170 in the target memory 59 and then access tasks stored beginning at the address obtained.

In step 418, the status output module 176 monitors status of the actuators 160 and the sensors 150 based on the execution performed in steps 416. The status output module 176 may also monitor the state of various variables stored in the target memory 59 and/or state of data stored at predetermined addresses in the target memory 59.

In step 420, the status output module 176 generates a status signal that is transmitted to the host control module 64 and/or the prototype monitor 120. This transmission may be performed based on a request signal received from the host control module 64 and/or the prototype monitor 120.

In step 422, the prototype monitor 120 generates status signals that may be viewed in an evaluation window displayed on the GUI 80.

In step 424, the host control module 64 may control operation of the production control module 58 based on state information associated with the status signals. For example, the host control module 64 may change the values of variables including gain variables stored in the target memory 59 and used by the on-target RCP code. The host control module 64 may transmit a control signal to the target control module 162 requesting a change in data stored in the target memory 59.

In step 426, the host control module may evaluate the status signals and corresponding information and compare with desired predetermine values and ranges. When desired test result values are obtained, control may proceed to step 428. When the status signals exceed the predetermined values or are outside of the predetermined ranges, control may return to one of steps 402 and 404 to modify the on-target RCP model and/or to generate a second on-target RCP model. The modification and/or generation may be based on the status signal received from the status output module 176 and or displayed on the GUI 80. Step 424 may be initiated by a developer or by the host control module 64. The host control module 64 may iteratively perform steps 402-426 including the modifying and generating of on-target RCP models until the status signals are within predetermined ranges.

The above-described steps are meant to be illustrative examples; the steps may be performed sequentially, synchronously, simultaneously, continuously, during overlapping time periods or in a different order depending upon the application.

The on-target RCP techniques described herein allow for RCP on various vehicles and systems. The techniques allow for the executing of control models (on-target RCP models) on target hardware in or close to a production environment. The techniques reduce equipment, time, training and costs involved in RCP. The techniques reduce validation time of control methods.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A device comprising:
an interface configured to connect to a production control module of an end product without a computer connected between the interface and the production control module;
a host control module that generates a first RCP model based on selected function blocks in a block library;
a target language compiler that converts the first RCP model into source code;
a cross-compiler that coverts the source code into object code for the end product, wherein the object code is executable by the production control module in the end product; and
a download module that performs an on-target download of the object code directly from the device to the production control module without downloading the object code from the device to a computer, separate from the production control module, for integration of the object code with other code, wherein the production control module is separate from the device, wherein the download module stores the object code in a memory of the end product such that the object code is stored as a portion of an application code, wherein the object code is stored in the memory subsequent to the application code being stored in the memory, and wherein the application code includes production ready code executed via the production control module.

2. The device of claim 1, further comprising a prototype monitor that communicates with the production control module and monitors states of a production system of the end product based on execution of the object code by the production control module,
wherein the host control module controls operation of the production control module based on the states.

3. The device of claim 1, further comprising a graphical user interface,
wherein the host control module displays a block window on the graphical user interface for the selection and connection of the function blocks.

4. The device of claim 1, wherein:
the host control module generates the first RCP model based on a system target file and target language compiler options; and
the target language compiler options comprise at least one of a variable value setting option and a template selector option.

5. The device of claim 1, further comprising a linker that converts function identifiers in the source code to function addresses associated with functions stored in a target memory of a production system of the end product, wherein the linker converts the function identifiers during cross-compiling of the source code.

6. The device of claim 1, wherein the host control module includes a real-time workshop module that generates a math model based on the selected function blocks.

7. The device of claim 1, further comprising an attribute selector that selects attributes for one of the selected function blocks, wherein:
the attributes comprise an address and a data type of data stored in memory of a production system of the end product; and
code associated with the one of the function blocks is generated based on the selected attributes.

8. The device of claim 1, further comprising a configuration module that selects the production control module from a list of production control modules stored in memory of the device,
wherein the target language compiler and the cross-compiler generate the source code and the object code based on the selected production control module.

9. The device of claim 1, further comprising a task schedule generator that generates a task schedule for N RCP models including the first RCP model, where N is an integer, and
wherein the target language compiler and the cross-compiler generate the source code and the object code based on the task schedule.

10. The device of claim 1, further comprising the production control module that communicates with the host control module.

11. The device of claim 10, wherein the production control module receives the object code directly from the host control module.

12. The device of claim 10, wherein the host comprises a prototype monitor that communicates with a status output module of the production control module,
wherein the prototype monitor monitors states of a production system of the end product based on execution of the object code by the production control module and output of the status output module, and
wherein the host control module generates a second RCP model based on the states.

13. A production system comprising:
a production control module implemented in an end product;
a memory that stores (i) an application code, and (ii) an on-target rapid control prototyping (RCP) process code for the end product downloaded directly from a host device to the production control module without prior downloading of the on-target RCP process code to a computer, separate from the host device and the production control module, for integration of the on-target RCP process code with other code, wherein the on-target RCP process code is stored as a portion of the application code, wherein the on-target RCP process code is stored in the memory subsequent to the application code being stored in the memory, and wherein the application code includes production ready code executed via the production control module;
an application control module that executes the application code;
a RCP control module that executes the on-target RCP process code in the production control module; and
a target control module that communicates with the application control module and the RCP control module and controls operation of the production system based on the execution of the application code and the on-target RCP process code.

14. The production system of claim 13, further comprising a task scheduler that schedules execution of on-target RCP processes including execution of the on-target RCP process code.

15. The production system of claim 13, further comprising a status output module that monitors states of actuators and sensors of the production system and generates a status signal that is transmitted to the host device.

16. The production system of claim 13, wherein the production system comprises at least one of an engine, a transmission, an exhaust system, and a vehicle electronic control system, and
wherein the target control module controls operation of the at least one of the engine, the transmission, the exhaust system, and the vehicle electronic control system based the execution of the on-target RCP process code.

17. A production system comprising:
a production control module implemented in an end product;
a memory that stores (i) an application code, and (ii) an on-target rapid control prototyping (RCP) process code for the end product downloaded directly from a host device to the production control module without prior downloading of the on-target RCP process code to a computer, separate from the host device and the production control module, for integration of the on-target RCP process code with other code, wherein the on-target RCP process code is stored as a portion of the application code, wherein the on-target RCP process code is stored in the memory subsequent to the application code being stored in the memory, and wherein the application code includes production ready code executed via the production control module;
an application control module that executes the application code;
a RCP control module that executes the on-target RCP process code in the production control module; and
a target control module that communicates with the application control module and the RCP control module and controls operation of the production system based on the execution of the application code and the on-target RCP process code,
wherein
the application code comprises code to initiate an on-target RCP process code,
the on-target RCP process code comprises a model call command to execute a subroutine,
the subroutine refers to an address of a first prototype algorithm,
the memory stores a jump table, prototype algorithms of on-target RCP processes, and functions of the application code, wherein the prototype algorithms include the first prototype algorithm,
the jump table includes addresses of the prototype algorithms,
each of the prototype algorithms refers to corresponding ones of the functions of the application code,
the on-target RCP process code comprises a second model call command to execute a second subroutine,
the second subroutine refers to a second address of a second prototype algorithm, and the prototype algorithms include the second prototype algorithm.

18. The device of claim 12, wherein:
the download module directly downloads object code for the second RCP model from the device to the production control module; and
the second RCP model is a modified version of the first RCP model and includes a different structure than the first RCP model.

19. The production system of claim 13, wherein the memory, the application control module, the RCP control module, and the target control module are implemented in the production control module.

20. The device of claim 1, wherein:
the host control module is configured to control operation of the production control module and a vehicle system by changing values of variables while the production control module is executing the object code, wherein the variables are stored in the memory and accessed by the production control module during execution of the object code; and
the vehicle system includes at least one of an engine system, a transmission system, and an exhaust system.

21. The production system of claim 17, wherein the production control module is configured to execute tasks of the on-target RCP process code sequentially with tasks of the application code.

\* \* \* \* \*